United States Patent
Zhang et al.

(10) Patent No.: US 9,663,744 B2
(45) Date of Patent: May 30, 2017

(54) DISPERSANT VISCOSITY MODIFIERS

(71) Applicant: The Lubrizol Corporation, Wickliffe, OH (US)

(72) Inventors: Yanshi Zhang, Solon, OH (US); Matthew D. Gieselman, Wickliffe, OH (US); Adam J. Preston, Mentor, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 69 days.

(21) Appl. No.: 14/771,574

(22) PCT Filed: Feb. 14, 2014

(86) PCT No.: PCT/US2014/016428
§ 371 (c)(1),
(2) Date: Aug. 31, 2015

(87) PCT Pub. No.: WO2014/163790
PCT Pub. Date: Oct. 9, 2014

(65) Prior Publication Data
US 2016/0002561 A1    Jan. 7, 2016

Related U.S. Application Data

(60) Provisional application No. 61/777,148, filed on Mar. 12, 2013.

(51) Int. Cl.
| | | |
|---|---|---|
| *C10M 143/04* | (2006.01) | |
| *C10M 159/12* | (2006.01) | |
| *C08F 255/04* | (2006.01) | |
| *C08F 8/14* | (2006.01) | |
| *C08F 8/48* | (2006.01) | |

(52) U.S. Cl.
CPC ............ *C10M 143/04* (2013.01); *C08F 8/14* (2013.01); *C08F 8/48* (2013.01); *C08F 255/04* (2013.01); *C10M 159/12* (2013.01); *C10M 2203/1006* (2013.01); *C10M 2217/06* (2013.01); *C10N 2220/021* (2013.01); *C10N 2230/02* (2013.01); *C10N 2230/041* (2013.01); *C10N 2240/102* (2013.01)

(58) Field of Classification Search
CPC .............. C10M 143/04; C10M 159/12; C10M 2203/1006; C10M 2217/06; C10N 2220/021; C10N 2230/02; C10N 2230/041; C10N 2240/102; C08F 255/04; C08F 8/14; C08F 8/48
USPC ....................................................... 508/300
See application file for complete search history.

(56) References Cited

U.S. PATENT DOCUMENTS

| | | | |
|---|---|---|---|
| 4,482,464 A | 11/1984 | Karol et al. | |
| 5,567,344 A * | 10/1996 | Emert ....................... | C08F 8/00 508/233 |

FOREIGN PATENT DOCUMENTS

WO       2006/015130 A1    2/2006

* cited by examiner

*Primary Examiner* — James Goloboy
(74) *Attorney, Agent, or Firm* — Iken S. Sans; Teresan W. Gilbert

(57) ABSTRACT

The invention provides a dispersant viscosity modifier, and more specifically a metal free dispersant viscosity modifier. The invention provides compositions, including lubricating compositions containing the described dispersant viscosity modifier, such as heavy duty diesel lubricating compositions. The invention further relates to the use of the described dispersant viscosity modifier to improve the film thickness and/or antiwear performance of a lubricating composition, for example, a heavy duty diesel lubricating composition. The improved dispersant viscosity modifier of the invention is specially designed to protect against valve train and other crankcase wear in lubricating applications, including heavy soot conditions such as heavy duty diesel lubricating applications.

15 Claims, No Drawings

DISPERSANT VISCOSITY MODIFIERS

CROSS REFERENCE TO RELATED APPLICATION

This application claims priority from PCT Application Serial No. PCT/US2014/016428 filed on Feb. 14, 2014, which claims the benefit of U.S. Provisional Application No. 61/777,148 filed on Mar. 12, 2013, both incorporated herein by reference.

FIELD OF INVENTION

The invention provides a dispersant viscosity modifier, and more specifically a metal free dispersant viscosity modifier. The invention provides compositions, including lubricating compositions containing the described dispersant viscosity modifier, such as heavy duty diesel lubricating compositions. The invention further relates to the use of the described dispersant viscosity modifier to improve the film thickness and/or antiwear performance of a lubricating composition, for example, a heavy duty diesel lubricating composition.

BACKGROUND OF THE INVENTION

The present invention relates to dispersant viscosity modifiers for use in lubricants, especially for reducing soot-induced viscosity increase in heavy duty diesel engine lubricants.

Heavy duty diesel vehicles may use exhaust gas recirculation (EGR) engines in efforts to reduce environmental emissions. Among the consequences of recirculating the exhaust gas through the engine are different soot structures and increased viscosity of the oil at lower soot levels, compared with engines without EGR. It is desirable that oil exhibit minimal viscosity increase, e.g., less than 12 mm$^2$/sec (cSt) at 100° C. at a soot loading of 6 weight percent.

It is also desirable that a lubricating oil composition maintain a relatively stable viscosity over a wide range of temperatures. Viscosity improvers are often used to reduce the extent of the decrease in viscosity as the temperature is raised or to reduce the extent of the increase in viscosity as the temperature is lowered, or both. Thus, a viscosity improver ameliorates the change of viscosity of an oil containing it with changes in temperature. The fluidity characteristics of the oil are improved.

Traditional dispersant viscosity modifiers (DVMs) made from ethylene-propylene copolymers that have been radically grafted with maleic anhydride and reacted with various amines have shown desirable performance to prevent oil thickening in diesel engines.

However, these materials can provide poor antiwear protection, especially in high soot conditions, leading to increased wear in the engine, for example on the valve train and/or various parts of the crankcase.

There is an ongoing need for dispersant viscosity modifiers that provide viscosity control but which also provide good wear protection.

The present invention, therefore, solves the problem of providing a dispersant viscosity modifier having improved performance in engine tests, providing a good viscosity index, providing good soot dispersion and/or toleration properties, while also providing good antiwear protection and/or film thickness performance, particularly in diesel engines, and especially in heavy duty diesel engines employing exhaust gas recirculation.

SUMMARY OF THE INVENTION

The present invention relates to a dispersant viscosity modifier that includes an olefin-based polymer and one or more functional groups each independently attached to the olefin-based polymer. The functional group includes a linking group grafted onto the olefin-based polymer and an alpha-hydroxy or alpha-alkoxy carboxy group connected to the linking group.

In some embodiments, each functional group is represented by the structure:

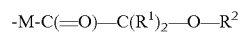

where M is a linking group, each R$^1$ is independently hydrogen or a hydrocarbyl group, and R$^2$ is hydrogen or a hydrocarbyl group or a polyalkyleneglycol (PAG) group, where R$^2$ may contain a ring or be linked to a R$^1$, when R$^1$ is a hydrocarbyl group, to form a ring. In some embodiments, R$^2$ is hydrogen or a linear alkyl group containing from 1 to 8 carbon atoms.

In some embodiments, the dispersant viscosity modifier is represented by the structure:

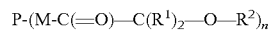

where P is an olefin-based polymer backbone, n is an integer from 1 to 6, M is a linking group, each R$^1$ is independently hydrogen or a hydrocarbyl group, and each R$^2$ is independently hydrogen or a hydrocarbyl group or a polyalkyleneglycol (PAG) group, where R$^2$ may contain a ring or be linked to R$^1$ to form a ring. In some embodiments, P is an ethylene-olefin-based copolymer, n is an integer from 1 to 4, each R$^1$ is hydrogen or a hydrocarbyl group, and each R$^2$ is hydrogen or a hydrocarbyl group, where R$^2$ may contain a ring or be linked to R$^1$, when R$^1$ is a hydrocarbyl group, to form a ring. In some of these embodiments, R$^2$ is hydrogen or a linear alkyl group containing from 1 to 8 carbon atoms.

The olefin-based polymer can have a number average molecular weight greater than 5000. In some embodiments, the olefin-based polymer is an ethylene-olefin-based copolymer where ethylene makes up at least 10 percent of the monomer used to prepare the copolymer on a molar basis.

In any of the embodiments described herein, the linking group may be derived from (i) an unsaturated carboxylic reactant and (ii) a hydroxy alkyl amine, an alkylene polyamine, a polyol, or a combination thereof. In some embodiments, the linking group is derived from maleic anhydride and a hydroxy alkyl amine.

The invention further provides a dispersant viscosity modifier that includes an olefin-based polymer which has been grafted with an unsaturated carboxylic reactant resulting in an olefin-based polymer with one or more acylating groups each independently attached to the polymer, where the acylating groups are further modified by reaction with a hydroxy alkyl amine, an alkylene polyamine, or a combination thereof, resulting in an olefin-based polymer with one or more linking groups each independently attached along the polymer, and where the linking groups are further modified by reaction with a glycolic acid, a similar material, or an ester thereof, resulting in a dispersant viscosity modifier.

The invention further provides a lubricant composition comprising a major amount of an oil of lubricating viscosity and a minor amount of the dispersant viscosity modifier described herein. This composition may further comprise a dispersant, a detergent, an overbased detergent, an antioxidant a viscosity modifier, a friction modifiers, a corrosion inhibitor, a pour point depressant, a seal swell agent, a demulsifier, an antiwear agent, or any combination thereof.

The invention further provides a process of making a dispersant viscosity modifier that includes the steps of: (I) grafting one or more unsaturated carboxylic reactants onto the backbone of an olefin-based polymer, resulting in an olefin-based polymer with one or more acylating groups each independently attached along the polymer's backbone; (II) reacting each acylating group with a hydroxy alkyl amine, an alkylene polyamine, a polyol, or a combination thereof, resulting in an olefin-based polymer with one or more linking groups each independently attached along the polymer's backbone; and (III) reacting each linking group with a glycolic acid, a similar material, or an ester thereof, resulting in a dispersant viscosity modifier.

The invention further provides for the use of the described dispersant viscosity modifier to improve the film thickness and/or antiwear performance of a heavy duty diesel lubricating composition.

DETAILED DESCRIPTION OF THE INVENTION

Various preferred features and embodiments will be described below by way of non-limiting illustration.

The amounts of additives present in the lubricating composition disclosed herein are quoted on an oil free basis, i.e. amount of actives, unless otherwise noted.

The Dispersant Viscosity Modifier.

The present invention provides a dispersant viscosity modifier. As the name implies, dispersant viscosity modifiers are materials that provide viscosity modifier performance while also providing dispersant functionality.

The dispersant viscosity modifiers of the present invention include an olefin-based polymer and one or more functional groups each independently attached to the olefin-based polymer. Each functional group has a linking group that is grafted onto the olefin-based polymer, linking the functional group to the olefin-based polymer. Each functional group also has an alpha-hydroxy or alpha-alkoxy carboxy group connected to the linking group. In some embodiments, the dispersant viscosity modifiers of the present invention include from 1 to 50 of the described functional groups, or from 1 to 30, or from 1 to 20, 1 to 10, or even 1 to 6 or 1 to 4. In still other embodiments, the dispersant viscosity modifiers of the present invention include 1, 2, 3, 4, 5 and/or 6 functional groups.

In some embodiments, each functional group is represented by the structure:

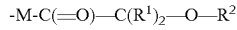

-M-C(=O)—C(R$^1$)$_2$—O—R$^2$ where M is a linking group, each R$^1$ is independently hydrogen or a hydrocarbyl group, and R$^2$ is hydrogen or a hydrocarbyl group or a polyalkyleneglycol (PAG) group, where R$^2$ may contain a ring or be linked to a R$^1$, when R$^1$ is a hydrocarbyl group, to form a ring. In some embodiments, R$^2$ is hydrogen or a linear alkyl group containing from 1 to 8 carbon atoms.

In some embodiments, the dispersant viscosity modifier is represented by the structure:

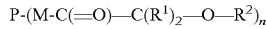

P-(M-C(=O)—C(R$^1$)$_2$—O—R$^2$)$_n$ where P is an olefin-based polymer backbone, n is an integer from 1 to 6, M is a linking group, each R$^1$ is independently hydrogen or a hydrocarbyl group, and each R$^2$ is independently hydrogen or a hydrocarbyl group or a polyalkyleneglycol (PAG) group, where R$^2$ may contain a ring or be linked to R$^1$ to form a ring. In some embodiments P is an ethylene-olefin-based copolymer, n is an integer from 1 to 4, each R$^1$ is hydrogen or a hydrocarbyl group, and each R$^2$ is hydrogen or a hydrocarbyl group, where R$^2$ may contain a ring or be linked to R$^1$, when R$^1$ is a hydrocarbyl group, to form a ring. In some of these embodiments, R$^2$ is hydrogen or a linear alkyl group containing from 1 to 8 carbon atoms.

In some embodiments, P is an ethylene-olefin-based copolymer, n is an integer from 1 to 4, R$^1$ is a alkylene group containing one carbon atom, and R$^2$ is hydrogen or a hydrocarbyl group, where R$^2$ may contain a ring or be linked to R$^1$ to form a ring. In some of these embodiments, R$^2$ is hydrogen or a linear alkyl group containing from 1 to 8 carbon atoms.

In some embodiments, the olefin-based polymer is an ethylene-olefin-based copolymer where ethylene makes up at least 10 percent of the monomer used to prepare the copolymer on a molar basis.

In any of these embodiments, the linking group is derived from an (i) unsaturated carboxylic reactant and (ii) a hydroxy alkyl amine, an alkylene polyamine, or a combination thereof. In some embodiment, the linking group is derived from maleic anhydride and a hydroxy alkyl amine.

The polymer or copolymer backbone employed in dispersant viscosity modifier of the invention is not particularly limited, provided that it can be modified with a carboxylic acid functionality or a reactive equivalent of carboxylic acid functionality (e.g., anhydride or ester) that serves as part of the linking group described above.

Suitable olefin-based polymer backbones include ethylene, propylene, butylene, copolymers thereof, copolymers thereof further containing a non-conjugated diene, and isobutylene/conjugated diene copolymers, each of which can be subsequently supplied with grafted carboxylic functionality to serve as the linking group, described in greater detail below. In some embodiments, the copolymers are ethylene propylene copolymers.

The polymerization reaction to form the olefin polymer backbone may be carried out by techniques well known in the field.

Ethylene-propylene or higher alpha monoolefin copolymers may consist of 15 to 80 mole % ethylene and 20 to 85 mole % propylene or higher monoolefin, in some embodiments, the mole ratios being 30 to 80 mole % ethylene and 20 to 70 mole % of at least one C3 to C10 alpha monoolefin, for example, 50 to 80 mole % ethylene and 20 to 50 mole % propylene. Terpolymer variations of the foregoing polymers may contain up to 15 mole % of a non-conjugated diene or triene.

In these embodiments, the polymer substrate, that is, typically the ethylene copolymer or terpolymer, can be an oil-soluble, substantially linear, rubbery material. Also, in certain embodiments, the polymer can be in forms other than substantially linear, that is, it can be a branched polymer or a star polymer. The polymer can also be a random copolymer or a block copolymer, including di-blocks and higher blocks, including tapered blocks and a variety of other structures. These types of polymer structures are known in the art and their preparation is within the abilities of the person skilled in the art.

The polymer backbone of the present invention may have a number average molecular weight (by gel permeation chromatography, polystyrene standard), which can typically be up to 150,000 or higher, e.g., 1,000 or 5,000 to 150,000 or to 120,000 or to 100,000, e.g., 10,000 to 50,000 and especially 10,000 to 15,000 (e.g., about 12,000) or 30,000 to 50,000 (e.g., about 40,000). In one embodiment, the polymer (that is, the polymer absent the amine component) has a number average molecular weight of greater than 5,000, for instance, greater than 5000 to 150,000. Other combinations of the above-identified molecular weight limitations are also contemplated. In some of these embodiments, the olefin-based polymer can have a number average molecular weight greater than 5,000 and my run up to 150,000, 120,000, or even 100,000.

The terms polymer and copolymer are used generically to encompass ethylene and/or higher alpha monoolefin polymers, copolymers, terpolymers or interpolymers. These materials may contain minor amounts of other olefinic monomers so long as their basic characteristics are not materially changed.

The dispersant viscosity modifiers of the invention include the olefin-based polymer backbone described above and a number of functional groups attached to the polymer backbone by a linking group. The linking group itself is derived from an (i) unsaturated carboxylic reactant and (ii) a hydroxy alkyl amine, an alkylene polyamine, a polyol or a combination thereof. In some embodiment, the linking group is derived from maleic anhydride and a hydroxy alkyl amine.

In some embodiments, the unsaturated carboxylic reactant is present in the olefin-based polymer backbone and the hydroxy alkyl amine and/or alkylene polyamine is reacted with the unsaturated carboxylic reactant group containing olefin-based polymer backbone. The resulting material may then be reacted with glycolic acid, or a similar material, to produce the dispersant viscosity modifiers of the invention where the section of the dispersant viscosity modifier that links the olefin-based polymer backbone to the group derived from the glycolic acid, or a similar material, is the linking group derived from the unsaturated carboxylic reactant is present in the olefin-based polymer backbone and the hydroxy alkyl amine and/or alkylene polyamine.

The unsaturated carboxylic reactant used to form the linking group may be derived from maleic acid and/or anhydride. As noted above, this portion of the linking group may be incorporated and/or attached to the polymer backbone during the polymerization of the polymer backbone, for example, by mixing a monomer containing the linking group in with the other monomers used to prepare the polymer backbone. In other embodiments, this part of the linking group may be added by grafting the group onto an already prepared polymer backbone.

As noted above, in some embodiments the unsaturated carboxylic reactant used to form the linking group is contained within a monomer copolymerized within the polymer backbone chain. In other embodiments, the unsaturated carboxylic reactant may be present as a pendant group attached by, for instance, a grafting process.

Examples of suitable carboxylic-acid containing polymers, which would represent the polymer backbone described above with carboxylic reactant portion of the liking group attached, include maleic anhydride-styrene copolymers, including partially esterified versions thereof. Nitrogen-containing esterified carboxyl-containing interpolymers prepared from maleic anhydride and styrene-containing polymers are known from U.S. Pat. No. 6,544,935, Vargo et al. Other polymer backbones have also been used for preparing dispersants. For example, polymers derived from isobutylene and isoprene have been used in preparing dispersants and are reported in PCT publication WO 01/98387. Other polymer backbones include substantially hydrogenated copolymers of vinyl aromatic materials such as styrene and unsaturated hydrocarbons such as conjugated dienes, e.g., butadiene or isoprene. In substantially hydrogenated polymers of this type, the olefinic unsaturation is typically substantially completely hydrogenated by known methods, but the aromatic unsaturation may remain. Such polymers can include random copolymers, block copolymers, or star copolymers. Yet other suitable backbone polymers include styrene-ethylene-alpha olefin polymers, as described in PCT publication WO 01/30947, and polyacrylates or polymethacrylates. In the case of such poly(meth)acrylates, the (meth)acrylate monomers within the polymer chain itself may serve as the carboxylic acid functionality or reactive equivalent thereof which is used to react with the amine component, described below. Alternatively, additional acid functionality may be copolymerized into the (meth)acrylate chain or even grafted onto it, particularly in the case of acrylate polymers.

In certain embodiments, the polymer backbone may be prepared from ethylene and propylene or it may be prepared from ethylene and a higher olefin within the range of (C3-C10) alpha-monoolefins, which may then in either case be grafted with a suitable carboxylic acid-containing species (i.e., monomer), to serve as the linking group.

More complex polymer substrates, often designated as interpolymers, may also be included. Such materials are generally used to prepare an interpolymer substrate is a polyene monomer selected from conjugated or non-conjugated dienes and trienes. The non-conjugated diene component is one having from about 5 to about 14 carbon atoms. Preferably, the diene monomer is characterized by the presence of a vinyl group in its structure and can include cyclic and bicyclo compounds. Representative dienes include 1,4-hexadiene, 1,4-cyclohexadiene, dicyclopentadiene, 5-ethylidene-2-norbornene, 5-methylene-2-norbornene, 1,5-heptadiene, and 1,6-octadiene. A mixture of more than one diene can be used in the preparation of the interpolymer.

An ethylenically unsaturated carboxylic acid material is typically grafted onto the polymer backbone. These materials which are attached to the polymer typically contain at least one ethylenic bond (prior to, reaction) and at least one, preferably two, carboxylic acid (or its anhydride) groups or a polar group which is convertible into said carboxyl groups by oxidation or hydrolysis. Maleic anhydride or a derivative thereof is suitable. It grafts onto the ethylene copolymer or terpolymer to give two carboxylic acid functionalities. Examples of additional unsaturated carboxylic materials include chlormaleic anhydride, itaconic anhydride, or the corresponding dicarboxylic acids, such as maleic acid, fumaric acid, acrylic acid, cinnamic acid, and their esters.

The ethylenically unsaturated carboxylic acid material may be grafted onto the polymer (preferably an ethylene/propylene copolymer) in a number of ways. Whatever route is used the resulting polymer intermediate is characterized by having carboxylic acid acylating functions within its structure.

This polymer intermediate may then be reacted with the hydroxy alkyl amine, alkylene polyamine, or a combination thereof. This reaction results in an olefin-based polymer backbone with the full linking group present. This material can then be reacted with glycolic acid, or a similar material, to result in the dispersant viscosity modifiers of the invention.

The hydroxy alkyl amines and/or alkylene polyamines suitable for use in the invention are not overly limited. In some embodiments, they may described as having a formula of:

$R^3R^4N$—$R^5$—OH or $R^3R^4N$—$R^5$—$NR^3R^4$ where each $R^3$ is independently hydrogen or a hydrocarbyl group containing from 1 to 6 carbon atoms, each $R^4$ is independently hydrogen or a hydrocarbyl group containing from 1 to 6 carbon atoms, and each $R^5$ is independently an alkylene group containing from 1 to 10 carbon atoms. In some embodiments, the dispersant viscosity modifiers of the invention is prepared using a hydroxy alkyl amine. In some embodiments, the dispersant viscosity modifiers of the invention is prepared using an alkylene polyamine.

Suitable hydroxy alkyl amines include amines having at least one amine group and at least one hydroxyl group, where the amine group is a primary, secondary or tertiary amine group. The hydroxy alkyl amines may have 2 to 30 carbon atoms. The hydroxy alkyl amines may include mono-, di- and tri-alkoxylates of ammonia such as mono- and di- and tri-ethanolamine, hydroxy-containing monoamines such as a diethoxylated C16 to C18 tallowamine, and hydroxy-containing polyamines such as 2-(2-aminoethyl-amino)ethanol. In some embodiments the hydroxy alkyl amines includes 3-hydroxypropyl amine.

Suitable polyamines may have from 2 to 30 carbon atoms. The polyamine may include alkylenediamines, N-alkyl alkylenediamines, and polyalkylenepolyamines. Useful polyamines include ethylenediamine, 1,2-diaminopropane, N-methylethylenediamine, N-tallow(C16-C18)-1,3-propylenediamine, N-oleyl-1,3-propylenediamine, polyethylenepolyamines such as diethylenetriamine and triethylenetetramine and tetraethylenepentamine and polyethylenepolyamine bottoms.

The polyols suitable for use in the invention are not overly limited. In some embodiments, they may described as having a formula of:

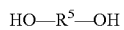

where $R^5$ is hydrocarbyl group, and in some embodiments an alkylene group, containing from 1 to 10 carbon atoms. In some embodiments, the dispersant viscosity modifiers of the invention are prepared using an alkylene diol, an aminopolyol, or combinations thereof. Examples of suitable materials include butanediol, hexanediol, 2-Amino-2-hydroxymethyl-propane-1,3-diol (THAM), and combinations thereof.

As noted above, the reaction product of the olefin-based polymer backbone containing the unsaturated carboxylic reactant and the hydroxy alkyl amine and/or alkylene polyamine and/or polyol may then be reacted with glycolic acid or a similar material to provide the dispersant viscosity modifiers of the invention. In some embodiments, glycolic acid is used, however a material having the structure:

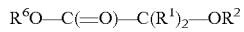

could also be used, where $R^1$ and $R^2$ have the same definitions provided above, and where $R^6$ is hydrogen or a hydrocarbyl group. In some embodiments, $R^6$ is hydrogen. Other suitable examples include lactic acid, tetrahydrofuran-2-carboxylic acid, malic acid, citric acid, tartaric acid, adipic acid, or combination thereof. In some embodiments, the acid is glycolic acid, lactic acid, tetrahydrofuran-2-carboxylic acid, or a combination thereof. In other embodiments, glycolic acid is used. Other suitable materials that may be used in place of the glycolic acid include the acids described herein with a PAG group attached, for example, alkylethercarboxylic acids, such as those having the structure:

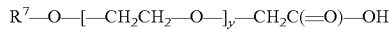

where $R^7$ is a straight or branched hydrocarbyl group, and in some embodiments an alkyl group, containing from 6 to 18 carbon atoms, and y is an integer from 0 to 10, 0 to 5, or from 1 to 10, or 1 to 5. Such materials are described in greater detail in US patent application 2012/0035088.

In some embodiments, the dispersant viscosity modifiers of the present invention is the reaction product of (i) an olefin-based polymer, for example an ethylene propylene copolymer, that has been functionalized with a unsaturated carboxylic reactant, for example, by using maleic anhydride, and (ii) a hydroxy alkyl amine and/or an alkylene polyamine, for example, a hydroxy alkyl amine such as 3-hydroxypropylamine. The resulting intermediate can then be reacted with a material such as glycolic acid to provide a dispersant viscosity modifier according to the invention.

Oils of Lubricating Viscosity

The lubricating compositions of the invention comprise an oil of lubricating viscosity. Suitable oils include both natural and synthetic oils, oil derived from hydrocracking, hydrogenation, and hydro finishing, unrefined, refined, re-refined oils or mixtures thereof.

Unrefined oils are those obtained directly from a natural or synthetic source generally without (or with little) further purification treatment.

Refined oils are similar to the unrefined oils except they have been further treated in one or more purification steps to improve one or more properties. Purification techniques are known in the art and include solvent extraction, secondary distillation, acid or base extraction, filtration, percolation and the like.

Re-refined oils are also known as reclaimed or reprocessed oils, and are obtained by processes similar to those used to obtain refined oils and often are additionally processed by techniques directed to removal of spent additives and oil breakdown products.

Natural oils useful in making the inventive lubricants include animal oils, vegetable oils (e.g., castor oil,), mineral lubricating oils such as liquid petroleum oils and solvent-treated or acid-treated mineral lubricating oils of the paraffinic, naphthenic or mixed paraffinic-naphthenic types and oils derived from coal or shale or mixtures thereof.

Synthetic lubricating oils are useful and include hydrocarbon oils such as polymerized, oligomerised, or interpolymerised olefins (e.g., polybutylenes, polypropylenes, propyleneisobutylene copolymers); poly(1-hexenes), poly(1-octenes), trimers or oligomers of 1-decene, e.g., poly(1-decenes), such materials being often referred to as poly α-olefins, and mixtures thereof; alkyl-benzenes (e.g. dodecylbenzenes, tetra-decylbenzenes, dinonylbenzenes, di-(2-ethylhexyl)-benzenes); polyphenyls (e.g., biphenyls, terphenyls, alkylated polyphenyls); diphenyl alkanes, alkylated diphenyl alkanes, alkylated diphenyl ethers and alkylated diphenyl sulphides and the derivatives, analogs and homologs thereof or mixtures thereof.

Other synthetic lubricating oils include polyol esters (such as Priolube® 3970), diesters, liquid esters of phosphorus-containing acids (e.g., tricresyl phosphate, trioctyl phosphate, and the diethyl ester of decane phosphonic acid), or polymeric tetrahydrofurans. Synthetic oils may be produced by Fischer-Tropsch reactions and typically may be hydroisomerised Fischer-Tropsch hydrocarbons or waxes. In one embodiment, oils may be prepared by a Fischer-Tropsch gas-to-liquid synthetic procedure as well as other gas-to-liquid oils.

Oils of lubricating viscosity may also be defined as specified in April 2008 version of "Appendix E—API Base Oil Interchangeability Guidelines for Passenger Car Motor Oils and Diesel Engine Oils", section 1.3 Sub-heading 1.3. "Base Stock Categories". In one embodiment, the oil of lubricating viscosity may be an API Group II or Group III oil. In one embodiment, the oil of lubricating viscosity may be an API Group I oil.

The amount of the oil of lubricating viscosity present is typically the balance remaining after subtracting from 100 wt % the sum of the amount of the compound of the invention and the other performance additives.

The lubricating composition may be in the form of a concentrate and/or a fully formulated lubricant. If the lubricating composition of the invention (comprising the additives disclosed herein) is in the form of a concentrate which may be combined with additional oil to form, in whole or in part, a finished lubricant), the ratio of the of these additives to the oil of lubricating viscosity and/or to diluent oil include the ranges of 1:99 to 99:1 by weight, or 80:20 to 10:90 by weight.

Additional Performance Additives

The compositions of the invention may optionally comprise one or more addition performance additives. These additional performance additives may include one or more metal deactivators, viscosity modifiers, detergents, friction modifiers, antiwear agents, corrosion inhibitors, dispersants, dispersant viscosity modifiers (other than the compound of the present invention), extreme pressure agents, antioxidants, foam inhibitors, demulsifiers, pour point depressants, seal swelling agents, antiwear agents, and any combination or mixture thereof. Typically, fully-formulated lubricating oil will contain one or more of these performance additives, and often a package of multiple performance additives.

In one embodiment, the invention provides a lubricating composition further comprising a dispersant, an antiwear agent, a friction modifier, a viscosity modifier, an antioxidant, an overbased detergent, or a combination thereof, where each of the additives listed may be a mixture of two or more of that type of additive. In one embodiment, the invention provides a lubricating composition further comprising a polyisobutylene succinimide dispersant, an antiwear agent, a friction modifier, a viscosity modifier (typically an olefin copolymer such as an ethylene-propylene copolymer), an antioxidant (including phenolic and aminic antioxidants), an overbased detergent (including overbased sulfonates and phenates), or a combination thereof, where each of the additives listed may be a mixture of two or more of that type of additive.

In one embodiment, the lubricating composition of the invention further includes an antiwear agent such as a metal dihydrocarbyl dithiophosphate (typically zinc dialkyldithiophosphate), wherein the metal dihydrocarbyl dithiophosphate contributes at least 100 ppm, or at least 200 ppm, or 200 ppm to 1000 ppm, or 300 ppm to 800 ppm, or 400 ppm to 600 ppm of phosphorus to the lubricating composition. In one embodiment, the lubricating composition is free of or substantially free of zinc dialkyldithiophosphate (ZDDP).

Suitable dispersants for use in the compositions of the present invention include succinimide dispersants. In one embodiment, the dispersant may be present as a single dispersant. In one embodiment, the dispersant may be present as a mixture of two or three different dispersants, wherein at least one may be a succinimide dispersant.

The succinimide dispersant may be a derivative of an aliphatic polyamine, or mixtures thereof. The aliphatic polyamine may be aliphatic polyamine such as an ethylenepolyamine, a propylenepolyamine, a butylenepolyamine, or mixtures thereof. In one embodiment, the aliphatic polyamine may be ethylenepolyamine. In one embodiment, the aliphatic polyamine may be selected from the group consisting of ethylenediamine, diethylenetriamine, triethylenetetramine, tetraethylenepentamine, pentaethylenehexamine, polyamine still bottoms, and mixtures thereof.

The dispersant may be a N-substituted long chain alkenyl succinimide. Examples of N-substituted long chain alkenyl succinimide include polyisobutylene succinimide. Typically, the polyisobutylene from which polyisobutylene succinic anhydride is derived has a number average molecular weight of 350 to 5000, or 550 to 3000 or 750 to 2500. Succinimide dispersants and their preparation are disclosed, for instance in U.S. Pat. Nos. 3,172,892, 3,219,666, 3,316,177, 3,340,281, 3,351,552, 3,381,022, 3,433,744, 3,444,170, 3,467,668, 3,501,405, 3,542,680, 3,576,743, 3,632,511, 4,234,435, Re 26,433, and U.S. Pat. Nos. 6,165,235, 7,238,650 and EP Patent Application 0 355 895 A.

The dispersant may also be post-treated by conventional methods by a reaction with any of a variety of agents. Among these are boron compounds, urea, thiourea, dimercaptothiadiazoles, carbon disulfide, aldehydes, ketones, carboxylic acids, hydrocarbon-substituted succinic anhydrides, maleic anhydride, nitriles, epoxides, and phosphorus compounds.

The dispersant may be present at 0.01 wt % to 20 wt %, or 0.1 wt % to 15 wt %, or 0.1 wt % to 10 wt %, or 1 wt % to 6 wt % of the lubricating composition.

In one embodiment, the lubricating composition of the invention further comprises a dispersant viscosity modifier other than the materials describer above. The additional dispersant viscosity modifier may be present at 0 wt % to 5 wt %, or 0 wt % to 4 wt %, or 0.05 wt % to 2 wt % of the lubricating composition.

Suitable dispersant viscosity modifiers include functionalized polyolefins, for example, ethylene-propylene copolymers that have been functionalized with an acylating agent such as maleic anhydride and an amine; polymethacrylates functionalized with an amine, or esterified styrene-maleic anhydride copolymers reacted with an amine. More detailed description of dispersant viscosity modifiers are disclosed in International Publication WO2006/015130 or U.S. Pat. Nos. 4,863,623; 6,107,257; 6,107,258; and 6,117,825. In one embodiment, the dispersant viscosity modifier may include those described in U.S. Pat. No. 4,863,623 (see column 2, line 15 to column 3, line 52) or in International Publication WO2006/015130 (see page 2, paragraph [0008] and preparative examples are described paragraphs [0065] to [0073]).

In one embodiment, the invention provides a lubricating composition which further includes a phosphorus-containing antiwear agent. Typically, the phosphorus-containing antiwear agent may be a zinc dialkyldithiophosphate, or mixtures thereof. Zinc dialkyldithiophosphates are known in the art. The antiwear agent may be present at 0 wt % to 3 wt %, or 0.1 wt % to 1.5 wt %, or 0.5 wt % to 0.9 wt % of the lubricating composition.

In one embodiment, the invention provides a lubricating composition further comprising a molybdenum compound. The molybdenum compound may be selected from the group consisting of molybdenum dialkyldithiophosphates, molybdenum dithiocarbamates, amine salts of molybdenum compounds, and mixtures thereof. The molybdenum compound may provide the lubricating composition with 0 to 1000 ppm, or 5 to 1000 ppm, or 10 to 750 ppm 5 ppm to 300 ppm, or 20 ppm to 250 ppm of molybdenum.

In one embodiment, the invention provides a lubricating composition further comprising an overbased detergent. The overbased detergent may be selected from the group consisting of non-sulfur containing phenates, sulfur containing phenates, sulfonates, salixarates, salicylates, and mixtures thereof.

The overbased detergent may also include "hybrid" detergents formed with mixed surfactant systems including phenate and/or sulfonate components, e.g. phenate/salicylates, sulfonate/phenates, sulfonate/salicylates, sulfonates/phenates/salicylates, as described; for example, in U.S. Pat. Nos. 6,429,178; 6,429,179; 6,153,565; and 6,281,179. Where, for example, a hybrid sulfonate/phenate detergent is employed, the hybrid detergent would be considered equivalent to amounts of distinct phenate and sulfonate detergents introducing like amounts of phenate and sulfonate soaps, respectively.

Typically, an overbased detergent may be sodium salts, calcium salts, magnesium salts, or mixtures thereof of the phenates, sulfur containing phenates, sulfonates, salixarates and salicylates. Overbased phenates and salicylates, typically have a total base number of 180 to 450 TBN. Overbased sulfonates typically have a total base number of 250 to 600, or 300 to 500. Overbased detergents are known in the art. In one embodiment, the sulfonate detergent may be predominantly a linear alkylbenzene sulfonate detergent having a metal ratio of at least 8 as is described in paragraphs [0026] to [0037] of US Patent Application 2005065045 (and granted as U.S. Pat. No. 7,407,919). The linear alkylbenzene sulfonate detergent may be particularly useful for assisting in improving fuel economy. The linear alkyl group may be attached to the benzene ring anywhere along the linear chain of the alkyl group, but often in the 2, 3 or 4 position of the linear chain, and in some instances in predominantly in the 2 position, resulting in the linear alkylbenzene sulfonate detergent. Overbased detergents are known in the art. The overbased detergent may be present at 0 wt % to 15 wt %, or 0.1 wt % to 10 wt %, or 0.2 wt % to 8 wt %, or 0.2 wt % to 3 wt %. For example, in a heavy duty diesel engine the detergent may be present at or 2 wt % to 3 wt % of the lubricating composition. For a passenger car engine the detergent may be present at 0.2 wt % to 1 wt % of the lubricating composition.

In one embodiment, the lubricating composition includes an antioxidant, or mixtures thereof. The antioxidant may be present at 0 wt % to 15 wt 5, or 0.1 wt % to 10 wt %, or 0.5 wt % to 5 wt % of the lubricating composition.

Antioxidants include sulfurized olefins, alkylated diarylamines (typically alkylated phenyl naphthyl amines for example those commercially available as Irganox® L 06 from CIBA, or alkylated diphenylamines such as dinonyl diphenylamine, octyl diphenylamine, dioctyl diphenylamine), hindered phenols, molybdenum compounds (such as molybdenum dithiocarbamates), or mixtures thereof.

The hindered phenol antioxidant often contains a secondary butyl and/or a tertiary butyl group as a sterically hindering group. The phenol group may be further substituted with a hydrocarbyl group (typically linear or branched alkyl) and/or a bridging group linking to a second aromatic group. Examples of suitable hindered phenol antioxidants include 2,6-di-tert-butylphenol, 4-methyl-2,6-di-tert-butylphenol, 4-ethyl-2,6-di-tert-butylphenol, 4-propyl-2,6-di-tert-butylphenol or 4-butyl-2,6-di-tert-butylphenol, or 4-dodecyl-2,6-di-tert-butylphenol. In one embodiment, the hindered phenol antioxidant may be an ester and may include, e.g., Irganox™ L-135 from Ciba. A more detailed description of suitable ester-containing hindered phenol antioxidant chemistry is found in U.S. Pat. No. 6,559,105.

Examples of additional friction modifiers include long chain fatty acid derivatives of amines, fatty esters, or epoxides; fatty imidazolines such as condensation products of carboxylic acids and polyalkylene-polyamines; amine salts of alkylphosphoric acids; fatty alkyl tartrates; fatty alkyl tartrimides; or fatty alkyl tartramides. In some embodiments, the term fatty, as used herein, can mean having a C8-22 linear alkyl group.

Friction modifiers may also encompass materials such as sulfurised fatty compounds and olefins, molybdenum dialkyldithiophosphates, molybdenum dithiocarbamates, sunflower oil or monoester of a polyol and an aliphatic carboxylic acid.

In one embodiment, the friction modifier may be selected from the group consisting of long chain fatty acid derivatives of amines, long chain fatty esters, or long chain fatty epoxides; fatty imidazolines; amine salts of alkylphosphoric acids; fatty alkyl tartrates; fatty alkyl tartrimides; and fatty alkyl tartramides. The friction modifier may be present at 0 wt % to 6 wt %, or 0.05 wt % to 4 wt %, or 0.1 wt % to 2 wt % of the lubricating composition.

In one embodiment, the friction modifier may be a long chain fatty acid ester. In another embodiment, the long chain fatty acid ester may be a mono-ester or a diester or a mixture thereof, and in another embodiment the long chain fatty acid ester may be a triglyceride.

Other performance additives such as corrosion inhibitors include those described in paragraphs 5 to 8 of U.S. application Ser. No. 05/038,319, published as WO2006/047486, octyl octanamide, condensation products of dodecenyl succinic acid or anhydride and a fatty acid such as oleic acid with a polyamine. In one embodiment, the corrosion inhibitors include the Synalox® corrosion inhibitor. The Synalox® corrosion inhibitor may be a homopolymer or copolymer of propylene oxide. The Synalox® corrosion inhibitor is described in more detail in a product brochure with Form No. 118-01453-0702 AMS, published by The Dow Chemical Company. The product brochure is entitled "SYNALOX Lubricants, High-Performance Polyglycols for Demanding Applications."

Metal deactivators including derivatives of benzotriazoles (typically tolyltriazole), dimercaptothiadiazole derivatives, 1,2,4-triazoles, benzimidazoles, 2-alkyldithiobenzimidazoles, or 2-alkyldithiobenzothiazoles; foam inhibitors including copolymers of ethyl acrylate and 2-ethylhexylacrylate and copolymers of ethyl acrylate and 2-ethylhexylacrylate and vinyl acetate; demulsifiers including trialkyl phosphates, polyethylene glycols, polyethylene oxides, polypropylene oxides and (ethylene oxide-propylene oxide) polymers; pour point depressants including esters of maleic anhydride-styrene, polymethacrylates, polyacrylates or polyacrylamides may be useful.

Pour point depressants that may be useful in the compositions of the invention include polyalphaolefins, esters of maleic anhydride-styrene, poly(meth)acrylates, polyacrylates or polyacrylamides.

In different embodiments, the lubricating composition may have a composition as described in the following table:

| Additive | Embodiments (wt %) | | |
| --- | --- | --- | --- |
| | A | B | C |
| Additive of Invention | 0.05 to 1 | 0.2 to 3 | 0.5 to 2 |
| Dispersant | 0.05 to 12 | 0.75 to 8 | 0.5 to 6 |
| Overbased Detergent | 0 or 0.05 to 15 | 0.1 to 10 | 0.2 to 8 |
| Antioxidant | 0 or 0.05 to 15 | 0.1 to 10 | 0.5 to 5 |
| Antiwear Agent | 0 or 0.05 to 15 | 0.1 to 10 | 0.3 to 5 |
| Friction Modifier | 0 or 0.05 to 6 | 0.05 to 4 | 0.1 to 2 |
| Viscosity Modifier | 0 or 0.05 to 10 | 0.5 to 8 | 1 to 6 |
| Any Other Performance Additive | 0 or 0.05 to 10 | 0 or 0.05 to 8 | 0 or 0.05 to 6 |

-continued

| Additive | Embodiments (wt %) | | |
|---|---|---|---|
| | A | B | C |
| Oil of Lubricating Viscosity | Balance to 100 | Balance to 100 | Balance to 100 |

The dispersant viscosity modifier of the invention may be present in embodiments (D) 0.1 to 8 wt %, or (E) 1 to 7 wt %, or (F) 2 to 6 wt %, or (G) 0.1 to 2 wt %, or (H) 0.3 to 1.2 wt % of the lubricating composition, with the amount of dispersant, overbased detergent, antioxidant, antiwear agent, friction modifier, viscosity modifier, any other performance additive and an oil of lubricating viscosity in amounts shown in the table above for embodiments (A) to (C).

INDUSTRIAL APPLICATION

In one embodiment, the invention provides a method of lubricating an internal combustion engine comprising the step of supplying to the internal combustion engine a lubricating composition as disclosed herein. Generally the lubricant is added to the lubricating system of the internal combustion engine, which then delivers the lubricating composition to the critical parts of the engine, during its operation, that require lubrication.

In one embodiment, the invention provides for the use of the dispersant viscosity modifier described herein to improve film thickness and/or antiwear performance of a lubricating composition. These improvements can be considered in addition to the dispersancy and viscosity control performance expected from a dispersant viscosity modifier.

The lubricating compositions described above may be utilized in an internal combustion engine. The engine components may have a surface of steel or aluminum (typically a surface of steel), and may also be coated for example, with a diamond like carbon (DLC) coating. An aluminum surface may be comprised of an aluminum alloy that may be a eutectic or hyper-eutectic aluminum alloy (such as those derived from aluminum silicates, aluminum oxides, or other ceramic materials). The aluminum surface may be present on a cylinder bore, cylinder block, or piston ring having an aluminum alloy, or aluminum composite.

The internal combustion engine may or may not have an Exhaust Gas Recirculation system. The internal combustion engine may be fitted with an emission control system or a turbocharger. Examples of the emission control system include diesel particulate filters (DPF), or systems employing selective catalytic reduction (SCR).

In one embodiment, the internal combustion engine may be a diesel fuelled engine (typically a heavy duty diesel engine), a gasoline fuelled engine, a natural gas fuelled engine or a mixed gasoline/alcohol fuelled engine. In one embodiment, the internal combustion engine may be a diesel fuelled engine and in another embodiment a gasoline fuelled engine. In one embodiment, the internal combustion engine may be a biodiesel fuelled engine. The internal combustion engine may be a 2-stroke or 4-stroke engine. Suitable internal combustion engines include marine diesel engines, aviation piston engines, low-load diesel engines, and automobile and truck engines. In one embodiment the internal combustion engine is a gasoline direct injection (GDI) engine.

The internal combustion engine of the present invention is distinct from gas turbine. In an internal combustion engine individual combustion events which through the rod and crankshaft translate from a linear reciprocating force into a rotational torque. In contrast, in a gas turbine (may also be referred to as a jet engine) it is a continuous combustion process that generates a rotational torque continuously without translation and can also develop thrust at the exhaust outlet. These differences result in the operation conditions of a gas turbine and internal combustion engine different operating environments and stresses.

The lubricant composition for an internal combustion engine may be suitable for any engine lubricant irrespective of the sulfur, phosphorus or sulfated ash (ASTM D-874) content. The sulfur content of the engine oil lubricant may be 1 wt % or less, or 0.8 wt % or less, or 0.5 wt % or less, or 0.3 wt % or less. In one embodiment, the sulfur content may be in the range of 0.001 wt % to 0.5 wt %, or 0.01 wt % to 0.3 wt %. The phosphorus content may be 0.2 wt % or less, or 0.12 wt % or less, or 0.1 wt % or less, or 0.085 wt % or less, or 0.08 wt % or less, or even 0.06 wt % or less, 0.055 wt % or less, or 0.05 wt % or less. In one embodiment, the phosphorus content may be 100 ppm to 1000 ppm, or 200 ppm to 600 ppm. The total sulfated ash content may be 2 wt % or less, or 1.5 wt % or less, or 1.1 wt % or less, or 1 wt % or less, or 0.8 wt % or less, or 0.5 wt % or less, or 0.4 wt % or less. In one embodiment, the sulfated ash content may be 0.05 wt % to 0.9 wt %, or 0.1 wt % to 0.2 wt % or to 0.45 wt %. In one embodiment, the lubricating composition may be an engine oil, wherein the lubricating composition may be characterized as having at least one of (i) a sulfur content of 0.5 wt % or less, (ii) a phosphorus content of 0.1 wt % or less, (iii) a sulfated ash content of 1.5 wt % or less, or combinations thereof.

EXAMPLES

The invention will be further illustrated by the following examples, which set forth particularly advantageous embodiments. While the examples are provided to illustrate the invention, they are not intended to limit it.

Example 1

A succinimide intermediate is prepared by adding to a 500 mL round bottom flask equipped with a mechanical stirrer, thermowell, nitrogen inlet, Dean-Stark trap and Friedrich's condenser, 303 grams of a maleated ethylene propylene copolymer, commercially available from Mitusi as Lucant™ A-5320H. The material is heated to 110° C. with stirring and nitrogen purge. Xylenes (40 mL) are added and then 9.1 grams of 3-aminopropanol is added to the mixture, resulting in the formation of a gel. Continued heating is applied and the gel eventually melts after about 60 minutes of agitation. The solution is then warmed to 150° C. and agitated for 2.5 hours. About 20 mL of toluene is added as an azeotropic assistant and the solution is warmed to 175° C. for 3 hours. The resulting polymer is stripped of solvents under deep vacuum at 175° C. for 40 minutes. 306 grams of the succinimide intermediate, appearing as a viscous yellow liquid, is recovered.

Example 2

A dispersant viscosity modifier is prepared by adding to a 250 mL round bottom flask equipped with a mechanical stirrer, thermowell, nitrogen inlet, Dean-Stark trap and Friedrich's condenser, 55 grams of the succinimide intermediate of Example 1 and 20 mL of toluene. The solution is heated to 120° C. with agitation and nitrogen purge. Then 0.12 grams of methanesulfonic acid is added. 2.74 grams of 70% glycolic acid is added portion-wise over 50 minutes. The solution is agitated at 120° C. for 2 hours. An additional 0.04 grams of methanesulfonic acid is added and the solution is warmed to 130° C. and agitated for an additional 2 hours. Solvent is then removed under deep vacuum at 110° C. to yield 54 grams of product, appearing as a viscous liquid.

Example 3

A dispersant viscosity modifier is prepared by adding to a 250 mL round bottom flask equipped with a mechanical stirrer, thermowell, nitrogen inlet, Dean-Stark trap and Friedrich's condenser, 47 grams of the succinimide intermediate of Example 1 and 30 mL of toluene. The solution is heated to 120° C. with agitation and nitrogen purge for 1 hour. Then 0.2 grams of Tin (II) ethylhexanoate is added and the solution is heated to 130° C. 2.3 grams of 70% glycolic acid is then added portion-wise over 1 hour. The reaction mixture is then heated to 140° C. and stirred for 3 hours and then heated to 164° C. and stirred for an additional 2 hours. Solvent is removed under deep vacuum at 160° C. for 30 minutes. 46 grams of product, appearing as a viscous, slightly cloudy liquid, is collected.

The inventive compositions from Examples 2 and 3 are then blended into group II diluent oil to a concentration of 10% actives polymer, as summarized in Table 1 below. Comparative Example 4 is a 10% blend of a conventional dispersant viscosity modifier prepared from the same maleated ethylene propylene copolymer as the Example 1 intermediate, but which is made from 4-4-(nitrophenylazo) aniline and 3-nitroaniline, as opposed to the 3-aminopropanol and glycolic acid. Examples 5 and 6 contain the dispersant viscosity modifiers of Examples 2 and 3 respectively. All of the blends have been designed to have nearly equivalent kinematic viscosities at 100° C. to allow for direct comparison.

TABLE 1

|  | Comparative Example 4 | Example 5 | Example 6 |
|---|---|---|---|
| Example 2 |  | 10 |  |
| Example 3 |  |  | 10 |
| Comp Example 4 | 10 |  |  |
| Group II Base Oil | balance | balance | balance |
| KV100 (cSt) | 12.76 | 12.96 | 12.70 |

The film thickness of the blends in Table 1, when subjected to boundary, mixed and hydrodynamic lubrication conditions is measured by an elastrohydrodynamic (EHD) ball on plate rig. Briefly, a chamber is flooded with one of the blends from Table 1. The chamber is equipped with a ball that rolls on a glass plate and a chromium spacer. By digital analysis of the interference patter of reflected light shined on the ball in contact with the plate, the film thickness is measured to the nanometer scale. The testing is performed at 120° C. and 140° C. over a variety of rolling speeds. Table 2 contains the film thickness at a variety of sliding speeds at 120° C. and 140° C. respectively.

TABLE 2

Film Thickness (nm) Data

| Rolling Speed | Comparative Example 4 | | Example 5 | | Example 6 | |
|---|---|---|---|---|---|---|
| (m/s) | 120° C. | 140° C. | 120° C. | 140° C. | 120° C. | 140° C. |
| 0.02 | 6.3 | 4.4 | 14.0 | 47.6 | 9.9 | 13.9 |
| 0.03 | 7.7 | 6.1 | 15.5 | 45.9 | 11.4 | 15.4 |
| 0.04 | 9.7 | 8.0 | 17.9 | 48.0 | 13.2 | 16.8 |
| 0.05 | 11.6 | 10.0 | 18.4 | 56.0 | 15.5 | 18.0 |
| 0.08 | 13.7 | 12.0 | 21.6 | 54.2 | 18.0 | 20.0 |
| 0.11 | 16.1 | 14.0 | 24.5 | 60.1 | 20.8 | 22.1 |
| 0.15 | 19.1 | 16.9 | 26.7 | 67.2 | 24.0 | 25.1 |
| 0.21 | 23.7 | 20.3 | 32.5 | 72.1 | 28.3 | 28.7 |
| 0.29 | 28.2 | 24.2 | 37.2 | 77.4 | 33.1 | 33.4 |
| 0.41 | 34.3 | 28.7 | 45.3 | 81.5 | 38.2 | 39.0 |
| 0.58 | 40.8 | 34.3 | 54.9 | 86.0 | 45.2 | 45.4 |
| 0.81 | 49.7 | 41.0 | 63.3 | 90.5 | 54.2 | 53.2 |
| 1.13 | 60.5 | 49.4 | 72.0 | 96.7 | 65.6 | 62.2 |
| 1.59 | 75.0 | 60.1 | 80.1 | 113.4 | 78.0 | 72.3 |
| 2.23 | 89.2 | 73.9 | 90.4 | 121.1 | 90.3 | 82.9 |
| 3.12 | 102.9 | 86.2 | 107.7 | 105.0 | 105.1 | 93.4 |
| 4.37 | 124.9 | 99.2 | 128.6 | 108.2 | 126.0 | 107.2 |

The results show the inventive examples give thicker films than the comparative example, and thus can be expected to provide improved wear and friction performance. The improvement in film thickness is especially pronounced at slow sliding speeds and higher temperatures (i.e. boundary conditions), further supporting the conclusion that the dispersant viscosity modifiers of the present invention can provide improved wear and friction performance over conventional dispersant viscosity modifiers.

Example 7

A succinimide intermediate is prepared according to a process similar to that described in Example 1 above, except that 3200.0 grams of the maleated ethylene propylene copolymer is used, no solvent is used, and 91.8 grams of 3-aminopropanol is added. The resulting polymer is stripped under deep vacuum and 3179.2 grams of the succinimide intermediate, appearing as a viscous yellow liquid, is recovered.

Example 8

A dispersant viscosity modifier is prepared by adding to a 1-L round bottom flask equipped with a mechanical stirrer, thermowell, nitrogen inlet, Dean-Stark trap and Friedrich's condenser, 257.6 grams of the succinimide intermediate of Example 7 and 252.4 grams of diluent oil. The solution is heated to 120° C. with agitation and nitrogen purge. Then 0.8 grams of methanesulfonic acid is added. 12.8 grams of 70% glycolic acid is added in one portion. The solution is agitated at 120° C. for 4 hours and then heated to 135° C. for 2 hours. Then 0.6 grams of a 50% caustic solution is added and the mixture is held at 135° C. for another 2 hours. The material is then filtered, resulting in 515.4 grams of product, appearing as a viscous liquid.

Example 9

A succinimide intermediate is prepared according to a process similar to that describes in Example 1 above, except that 750.0 grams of a maleated ethylene propylene copolymer with 6.5 wt % maleic anhydride is used, 1213.2 g of diluent oil are used in place of xylenes, and 30.3 grams of 3-aminopropanol is used. The resulting polymer is stripped under deep vacuum and 1712.0 grams of the succinimide intermediate, appearing as a viscous yellow liquid, is recovered.

Example 10

A dispersant viscosity modifier is prepared by adding to a 1-L round bottom flask equipped with a mechanical stirrer, thermowell, nitrogen inlet, Dean-Stark trap and Friedrich's condenser, 500.0 grams of the succinimide intermediate of Example 9 and 157.4 grams of diluent oil. The solution is heated to 110° C. with agitation and nitrogen purge. Then 0.8 grams of methanesulfonic acid and 13.6 grams of 70% glycolic acid are added. The solution is heated to 135° C. and held for 8 hours. Then 1.5 grams of a 50% caustic solution is added the mixture is held at 135° C. for another 1.5 hours. The material is then filtered, resulting in 663.2 grams of product, appearing as a viscous liquid.

The inventive compositions from Examples 8 and 10, and a comparative material are then blended into group II diluent oil to a concentration that provides samples with comparable kinematic viscosities. Just as above, all of the blends have been designed to have nearly equivalent kinematic viscosities at 100° C. to allow for direct comparison. Comparative Example 11 is a 12% blend of a conventional dispersant viscosity modifier prepared from a mercaptan, a mixture of acrylate ester, and a mixture of t-butyl perbenzoates/peroxoates, resulting in a nitrogen-containing polymethacrylate viscosity modifier. Comparative Example 12 contains the dispersant viscosity modifier of Comparative Example 11. Examples 13 and 14 contain the dispersant viscosity modifiers of Examples 8 and 10 respectively.

TABLE 3

| | Comparative Example 12 | Example 13 | Example 14 |
|---|---|---|---|
| Example 8 | | 8.1 | |
| Example 10 | | | 8.8 |
| Comp Example 11 | 12.0 | | |
| Group II Base Oil | balance | balance | balance |
| KV100 (cSt) | 12.7 | 13 | 13.2 |

The film thickness and wear performance of the blends in Table 3, where evaluated under in a HFRR test with the following conditions: 200 grams load, 75 minute duration, 20 HZ frequency, 1 mm stroke length. Table 4 contains the results from this testing.

TABLE 4

HFRR Data

| | Comparative Example 12 | | Example 13 | | Example 14 | |
|---|---|---|---|---|---|---|
| | 40 C. | 40-160 C. | 40 C. | 40-160 C. | 40 C. | 40-160 C. |
| Film thickness (nm) | 6% | 69% | 54% | 100% | 100% | 100% |
| Friction (COF) | 0.144 | 0.139 | 0.085 | 0.055 | 0.074 | 0.051 |
| Wear Scar, avg (um) | 203 | | 151 | | 111 | |

The results show the inventive examples give thicker films and improved wear protection than the comparative example.

Example 11

A functionalized viscosity modifier is prepared by first preparing a maleic anhydride grafted ethylene/propylene copolymer. The ethylene/propylene copolymer (OPC) is passed through a rubber grinder and fed at a controlled rate into the hopper of a heated twin screw extruder and reacted with maleic anhydride in the presence of a peroxide catalyst to yield a grafted OPC having: a GPC Mn of 43,700; a Mw of 95,000; and 3.0 wt. % grafted maleic anhydride as measured by infrared spectroscopy. To a 1-L round bottom flask equipped with a mechanical stirrer, thermowell, nitrogen inlet, and Dean-Stark trap and Friedrich's condenser is added 87.0 g of the grafted OPC, 512.4 g of an API group I 100N mineral oil, and 0.6 g of BHT. The contents of the flask are stirred at 130° C. under a nitrogen purge until the polymer is fully dissolved and a homogenous solution is obtained. The polymer solution is cooled to 80° C. To the flask is added 2.0 g of aminopropanol and an additional 78.8 g of diluent oil. The contents are stirred at 80° C. for 1 h after which the temperature is increased to 150° C. and held for 4 h. The flask is cooled and the product, a functionalized viscosity modifier, is obtained.

Example 12

A dispersant viscosity modifier is prepared by adding to a 1-L round bottom flask equipped with a mechanical stirrer, thermowell, nitrogen inlet, and Dean-Stark trap and Friedrich's condenser, 500.0 g of the grafted OPC from Example 11 and heating to 110° C. with stirring and a nitrogen purge. Then 0.26 g of methanesulfonic acid and 2.0 g of glycolic acid are added to the flask. The flask contents are heated to 135° C. and held at that temperature for 6 h. Next 0.2 g of a 50 wt % caustic solution is added and the mixture held at 135° C. for 1 h. The contents of the flask are filtered and the product, a functionalized viscosity modifier, obtained.

It is known that some of the materials described above may interact in the final formulation, so that the components of the final formulation may be different from those that are initially added. The products formed thereby, including the products formed upon employing lubricant composition of the present invention in its intended use, may not be susceptible of easy description. Nevertheless, all such modifications and reaction products are included within the scope of the present invention; the present invention encompasses lubricant composition prepared by admixing the components described above.

Each of the documents referred to above is incorporated herein by reference, as is the priority document and all related applications, if any, which this application claims the benefit of. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:

(i) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring);

(ii) substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulphoxy);

(iii) hetero substituents, that is, substituents which, while having a predominantly hydrocarbon character, in the context of this invention, contain other than carbon in a ring or chain otherwise composed of carbon atoms.

Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed:

1. A composition comprising a dispersant viscosity modifier comprising an olefin-based polymer and one or more functional groups each independently attached to the olefin-based polymer,
where the functional group comprises a linking group grafted onto the olefin-based polymer and an alpha-hydroxy or alpha-alkoxy carboxy group connected to the linking group.

2. The composition of claim 1 wherein each functional group is represented by the structure:

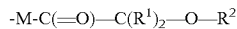

where M is a linking group, each $R^1$ is independently hydrogen or a hydrocarbyl group, and $R^2$ is hydrogen or a hydrocarbyl group or a polyalkyleneglycol (PAG) group, where $R^2$ may contain a ring or be linked to a $R^1$, when $R^1$ is a hydrocarbyl group, to form a ring.

3. The composition of claim 2 where $R^2$ is hydrogen or a linear alkyl group containing from 1 to 8 carbon atoms.

4. The composition of claim 1 wherein the dispersant viscosity modifier group is represented by the structure:

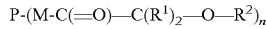

where P is an olefin-based polymer backbone, n is an integer from 1 to 6, M is a linking group, each $R^1$ is independently hydrogen or a hydrocarbyl group, and each $R^2$ is independently hydrogen or a hydrocarbyl group or a polyalkyleneglycol (PAG) group, where $R^2$ may contain a ring or be linked to $R^1$ to form a ring.

5. The composition of claim 4 wherein P is an ethylene-olefin-based copolymer, n is an integer from 1 to 4, each $R^1$ is hydrogen, and $R^2$ is hydrogen or a hydrocarbyl group.

6. The composition of claim 4 where $R^2$ is hydrogen or a linear alkyl group containing from 1 to 8 carbon atoms.

7. The compositions of claim 1 wherein the olefin-based polymer has a number average molecular weight greater than 5000.

8. The compositions of claim 1 wherein the olefin-based polymer is an ethylene-olefin-based copolymer where ethylene makes up at least 10 percent of the monomer used to prepare the copolymer on a molar basis.

9. The composition of claim 1 where the linking group is derived from an (i) unsaturated carboxylic reactant and (ii) a hydroxy alkyl amine, an alkylene polyamine, a polyol, or a combination thereof.

10. The composition of claim 9 wherein the linking group is derived from maleic anhydride and a hydroxy alkyl amine.

11. A composition comprising a dispersant viscosity modifier comprising an olefin-based polymer which has been grafted with an unsaturated carboxylic reactant resulting in an olefin-based polymer with one or more acylating groups each independently attached to the polymer,
where the acylating groups are further modified by reaction with a hydroxy alkyl amine, an alkylene polyamine, or a combination thereof, resulting in an olefin-based polymer with one or more linking groups each independently attached along the polymer, and
where the linking groups are further modified by reaction with a material having the structure:

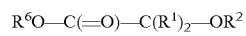

where $R^1$ is hydrogen or a hydrocarbyl group; $R^2$ is hydrogen or a hydrocarbyl group or a polyalkyleneglycol (PAG) group; where $R^2$ may contain a ring or be linked to a $R^1$, when $R^1$ is a hydrocarbyl group, to form a ring; where $R^6$ is hydrogen or a hydrocarbyl group;
resulting in a dispersant viscosity modifier.

12. A lubricant composition comprising a major amount of an oil of lubricating viscosity and a minor amount of the dispersant viscosity modifier of claim 1.

13. The lubricant composition of claim 12 wherein the composition further comprises a dispersant, a detergent, an overbased detergent, an antioxidant a viscosity modifier, a friction modifier, a corrosion inhibitor, a pour point depressant, a seal swell agent, a demulsifier, an antiwear agent, or any combination thereof.

14. A process of making a dispersant viscosity modifier comprising the steps of:
(I) grafting one or more unsaturated carboxylic reactants onto the backbone of an olefin-based polymer, resulting in an olefin-based polymer with one or more acylating groups each independently attached along the polymer's backbone;
(II) reacting each acylating group with a hydroxy alkyl amine, an alkylene polyamine, a polyol, or a combination thereof, resulting in an olefin-based polymer with one or more linking groups each independently attached along the polymer's backbone;
(III) reacting each linking group with a material having the structure:

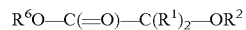

where $R^1$ is hydrogen or a hydrocarbyl group; $R^2$ is hydrogen or a hydrocarbyl group or a polyalkyleneglycol (PAG) group; where $R^2$ may contain a ring or be linked to a $R^1$, when $R^1$ is a hydrocarbyl group, to form a ring; where $R^6$ is hydrogen or a hydrocarbyl group;

resulting in a dispersant viscosity modifier.

15. A method of reducing wear in an internal combustion engine comprising lubricating said engine with the lubricating composition of claim 12.

* * * * *